R. H. SMITH.
NUT TAPPING MACHINE.
APPLICATION FILED FEB. 18, 1910.

1,138,901.

Patented May 11, 1915.
8 SHEETS—SHEET 1.

Witnesses.
E. B. Gilchrist
H. B. Sullivan

Inventor
Roy H. Smith
by
Thurston & Kwis
Attorneys

R. H. SMITH.
NUT TAPPING MACHINE.
APPLICATION FILED FEB. 18, 1910.

1,138,901.

Patented May 11, 1915.
8 SHEETS—SHEET 6.

Witnesses
E. B. Hilchind
H. P. Sullivan

Inventor
Roy H. Smith
by Thurston & Kwis
Attorneys

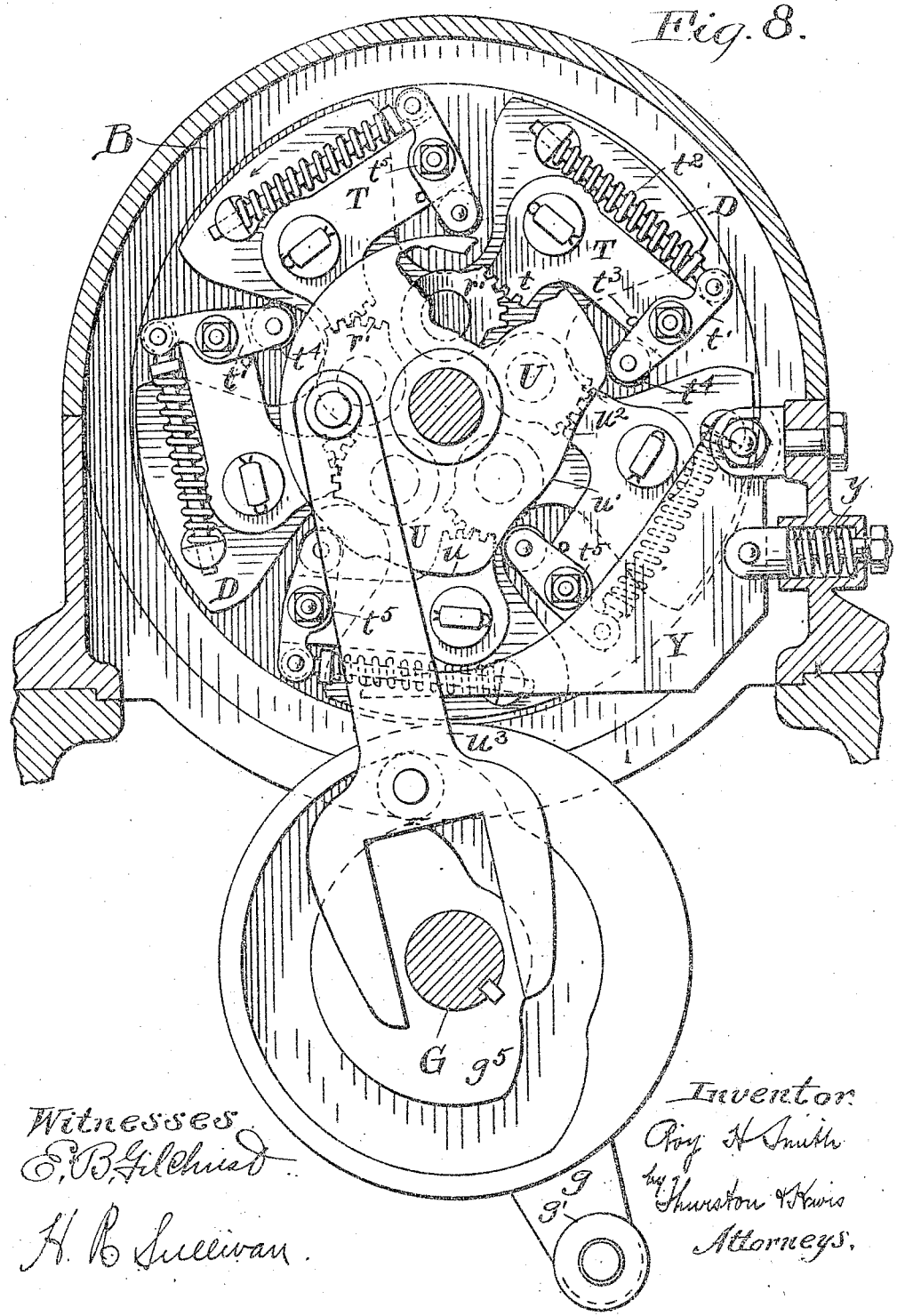

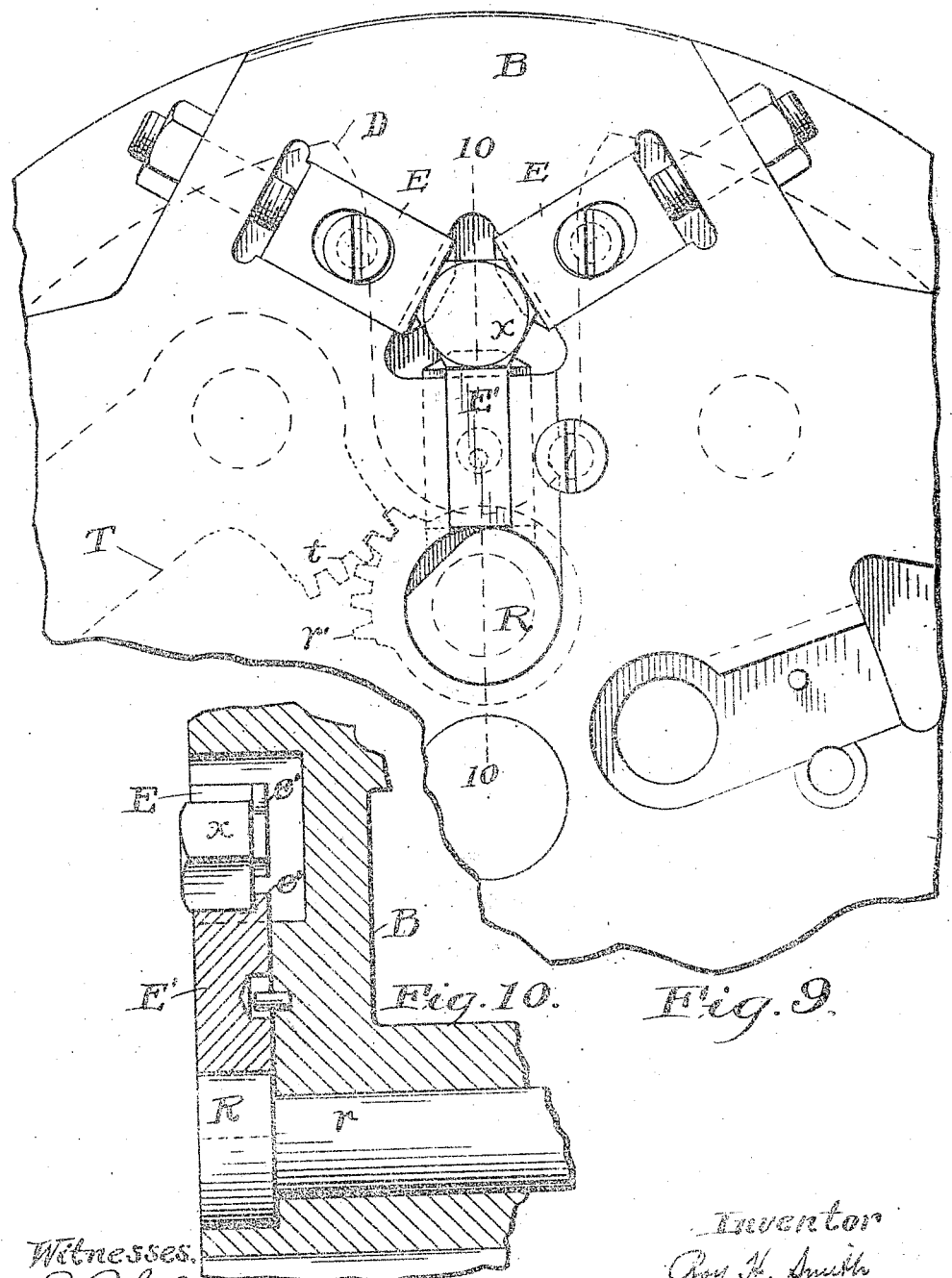

UNITED STATES PATENT OFFICE.

ROY H. SMITH, OF CLEVELAND, OHIO.

NUT-TAPPING MACHINE.

1,138,901.  Specification of Letters Patent.  Patented May 11, 1915.

Application filed February 18, 1910. Serial No. 544,555.

*To all whom it may concern:*

Be it known that I, ROY H. SMITH, a citizen of the United States, residing at Cleveland, in the county of Cuyahoga and State of Ohio, have invented a certain new and useful Improvement in Nut-Tapping Machines, of which the following is a full, clear, and exact description.

The present invention relates to automatic machinery for drilling, facing, and tapping nuts.

The object of the invention has been to produce an automatic machine capable of rapidly operating on imperforated blanks, and turning out tapped nuts having accurately faced bottom surfaces.

The above objects are attained in a practical and satisfactory way by that embodiment of the invention described in the following specification and illustrated in the accompanying drawings, in which:—

Figure 1:
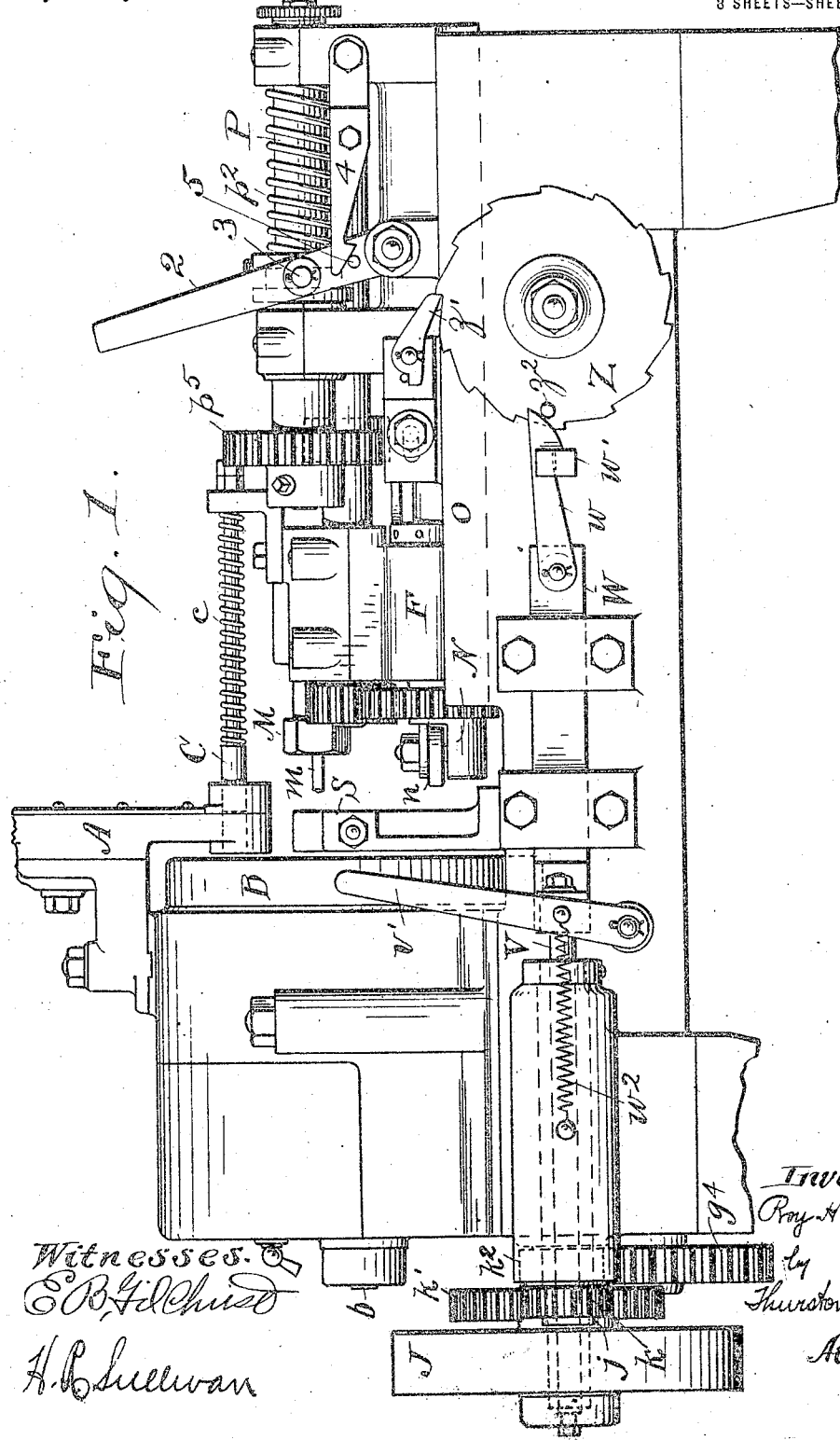
Figure 2:
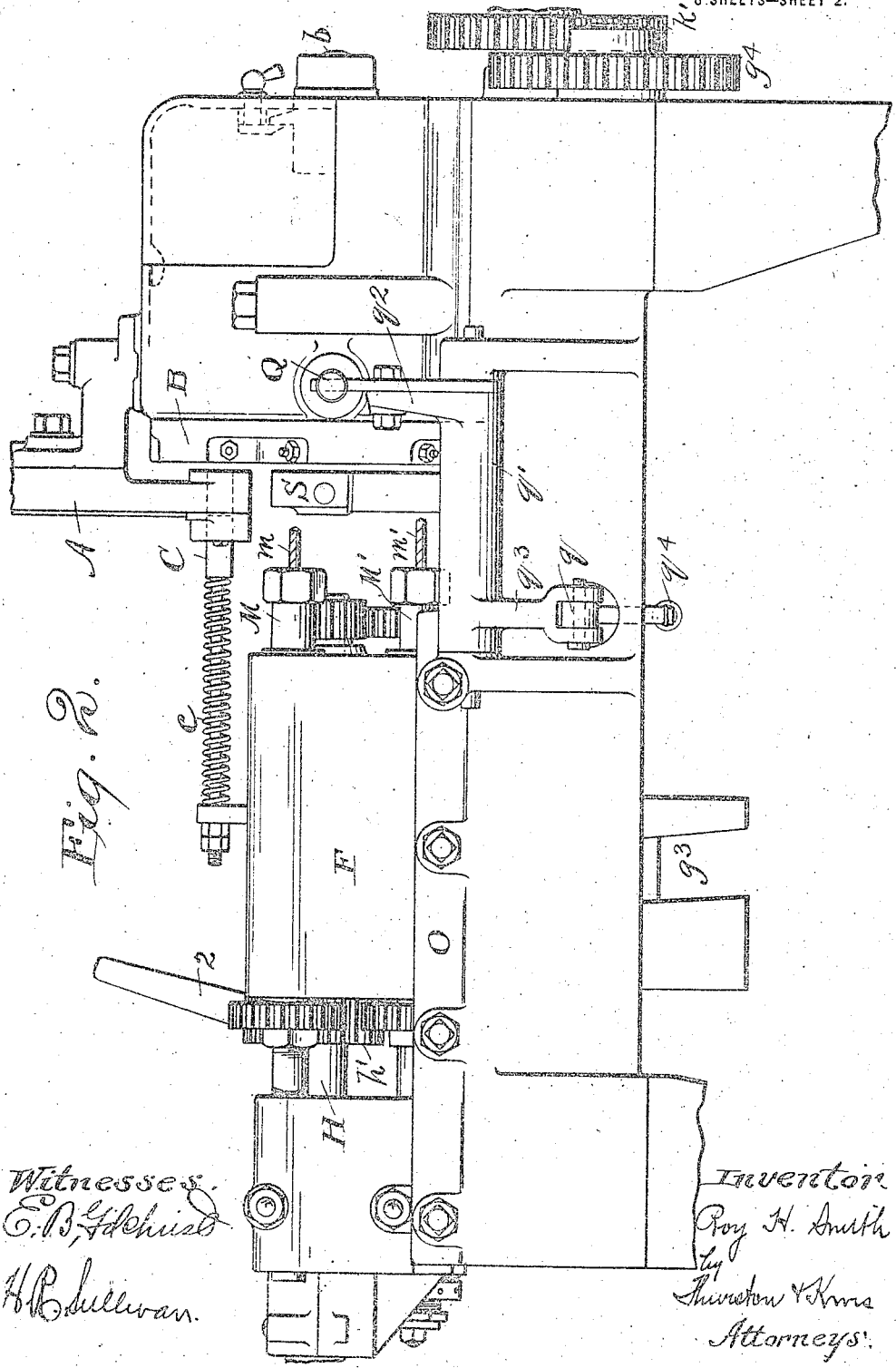
Figure 3:
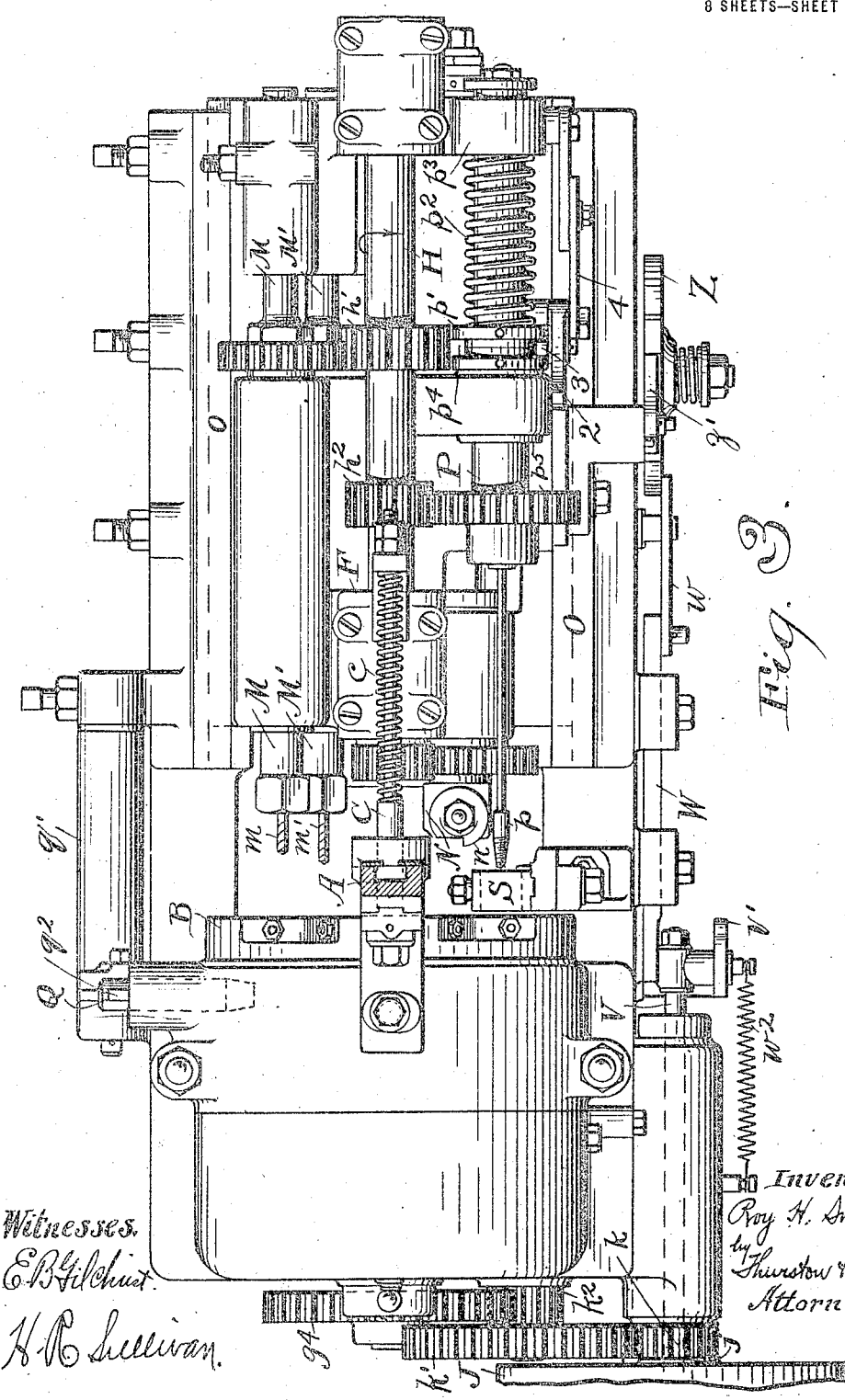
Figure 4:
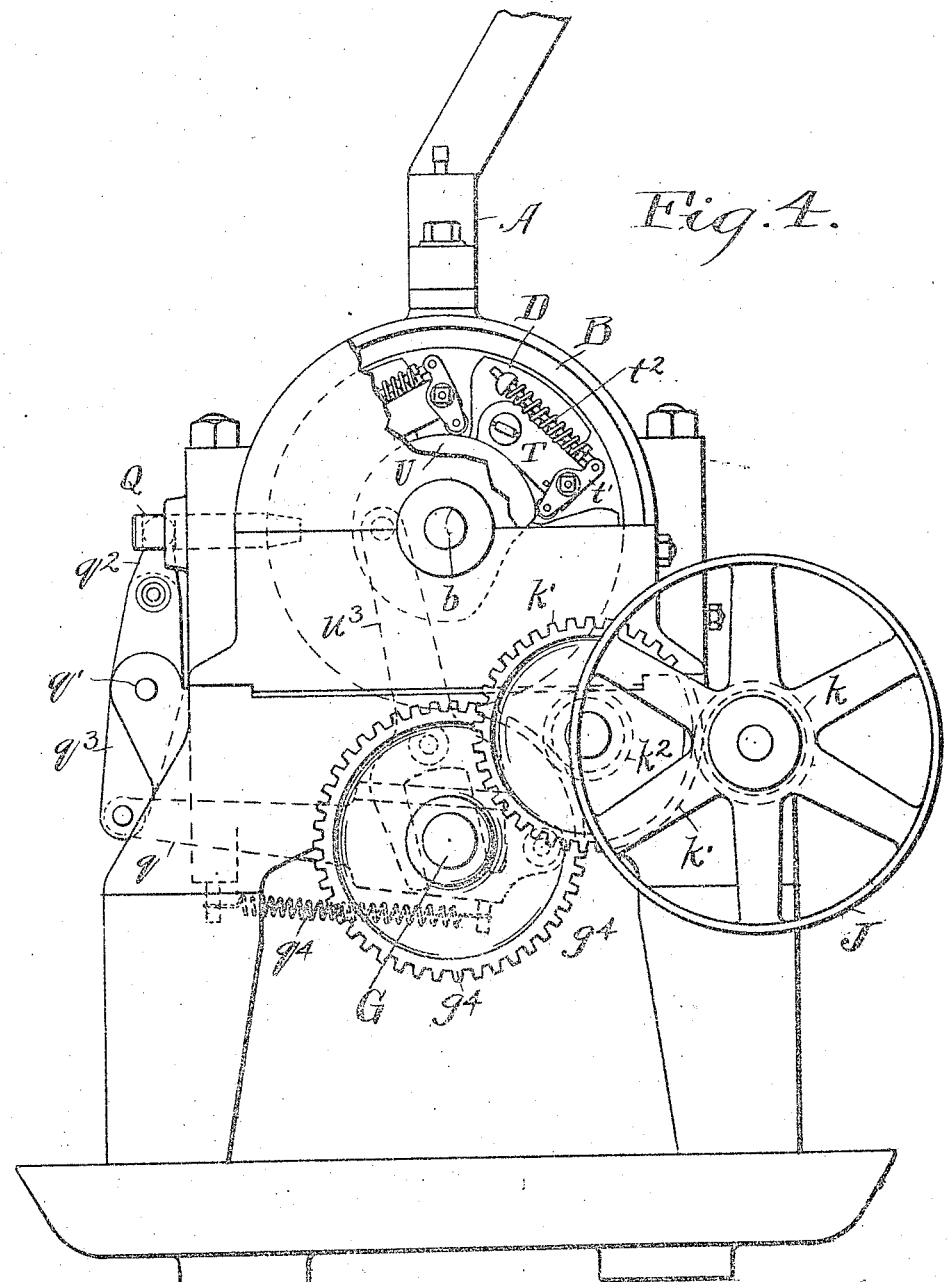
Figure 5:
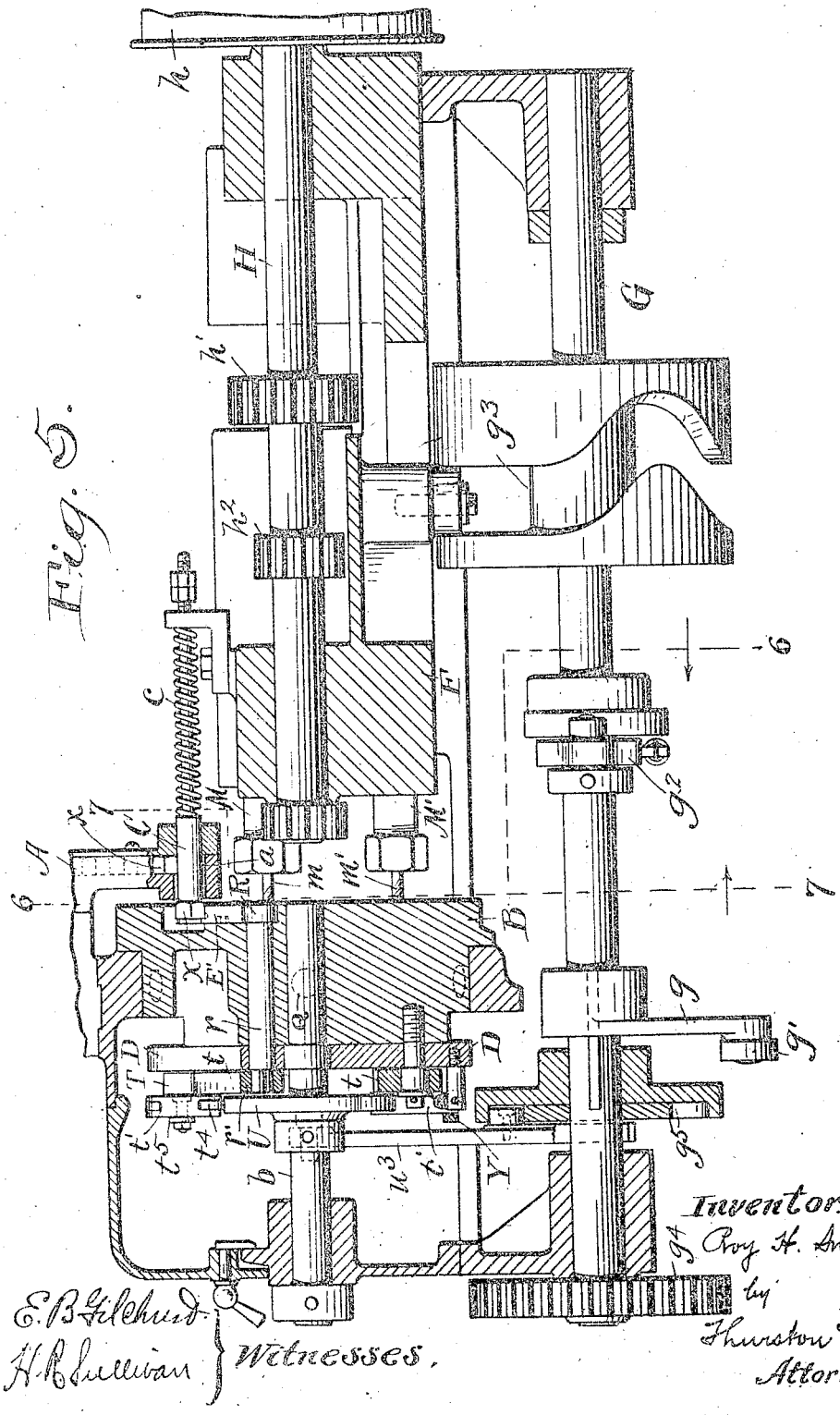
Figure 6:
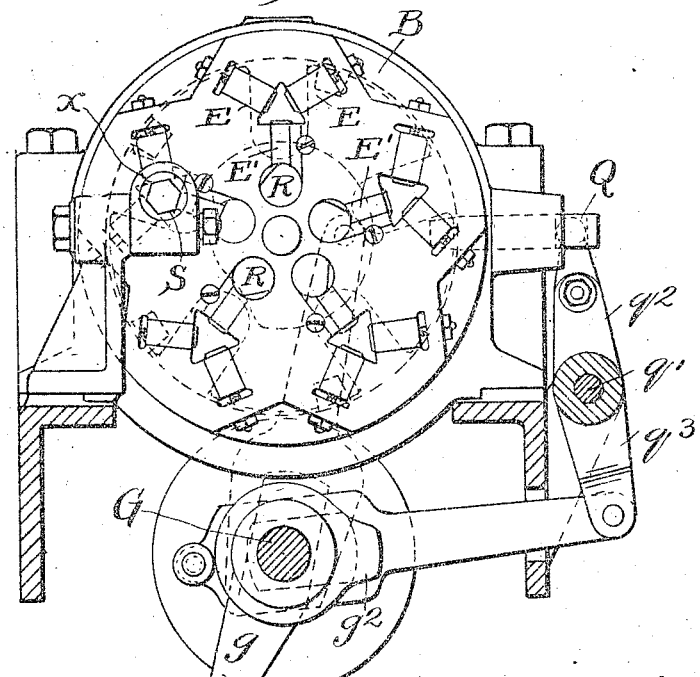
Figure 7:
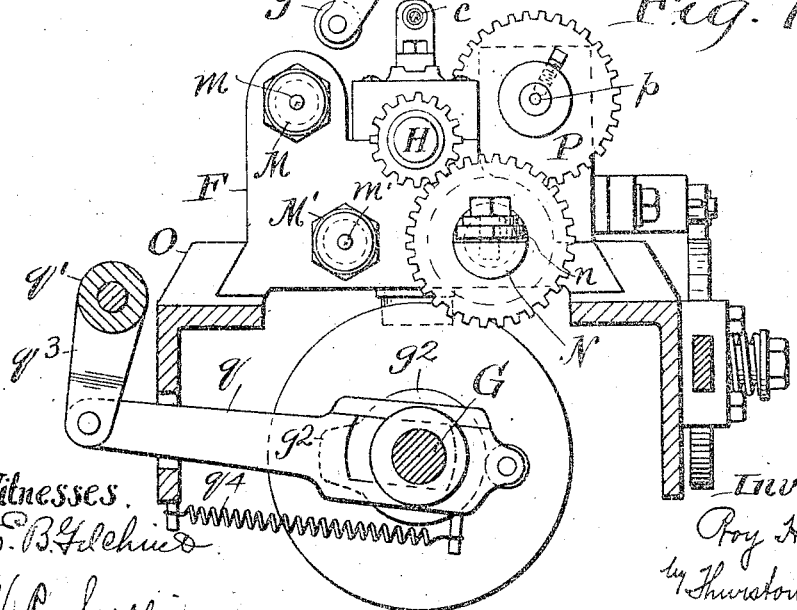

Figure 1 is a side elevation of the machine. Fig. 2 is a side elevation opposite to that of Fig 1. Fig. 3 is a top plan view. Fig. 4 is an end elevation partly broken away to show details of the operating parts. Fig. 5 is a vertical longitudinal section. Fig. 6 is a section on the line 6—6 of Fig 5 looking in the direction of the arrows. Fig. 7 is a section on the line 7—7 of Fig. 5 looking in the direction of the arrows. Fig. 8 is an enlarged end view partly broken away of the indexing device for rotating the turret and the gripping mechanism by which the nut blanks are held in their chucks. Fig. 9 is an enlarged detail elevation showing one of the chucks with a nut blank in place. Fig. 10 is a section on the line 10—10 of Fig. 9.

By way of preface it is here pointed out that the nut blanks are fed automatically to chucks on a turret which is turned intermittently by suitable indexing mechanism to bring the nuts serially to different operative stations; and that a head stock, which is reciprocated toward and from the turret, carries drills, a facing tool and a tap alined with the several stations, whereby each blank is successively acted upon by said drills, etc. and discharged from the chuck when finished, and whereby each of said tools is caused to operate at the same time on different blanks.

The blanks X descend by gravity through a vertical feed chute A into a feeding pocket $a$, from which they are thrust horizontally by a spring pressed plunger C into chucks on a turret B, which is rotatable about a horizontal axis. The chucks are arranged on the vertical face of the turret equi-distant from each other, and all at the same distance from the axis of the turret. There are five of these chucks in the construction shown; and the turret is periodically turned by suitable index mechanism through arcs corresponding with the arcual distance between successive chucks. The plunger C is carried by a sliding head stock F and reciprocates with it. The plunger is yieldingly pressed toward the turret by a spring $c$ which yields in case the nut in the feed pocket $a$ gets caught in any way. This head stock is slidably mounted on the machine bed O, and is reciprocated thereon by a suitable cam $g^3$ on cam shaft G. This cam shaft carries cams for performing numerous other functions as will be presently described. It is driven through a train of reduction gearing $k$, $k^1$, $k^2$ and $g^4$, by some suitable means such as a belt pulley J having a toothed clutch connection $j$ with one gear $k$ of the gear train,—this clutch being automatically releasable by a mechanism and for a purpose subsequently to be described. The head stock carries a driving shaft H which is driven through a second belt pulley $h$, this driving shaft having spur gear connections with the two drill spindles M, M', the facing tool spindle N and the tap spindle P. These spindles are rotatably mounted upon the head stock, and are parallel with each other and with the axis of the turret. The drilling operation being the slowest, two drills $m$, $m'$, secured respectively to the two drill spindles, are employed, the first drill $m$ being for operation upon the nut blank at the first station at which it stops after it has been carried by the turret from the station at which it was introduced to a holding chuck. The second drill is in such position that it will complete the drilling of the nut blank when the same is at the second index station. At the third index station a facing tool $n$ fixed to the facing tool spindle N operates on the face of the blank and finishes it in a plane absolutely true to the axis of the tap. At the fourth station at which the nut blank will be stopped the tap $p$ fixed to the tap spindle P is properly alined for the threading of the drilled blank.

The tap spindle P is mounted so as to be movable endwise in its bearings on the head stock. It is, however, held in its most forward position by means of a coiled spring $p^2$ which is compressed between a collar $p'$ on the tap spindle, and the rear bearing $p^3$ of said spindle. This construction permits the tap to yield when pushed against the blank, although the forward movement of the head stock continues. By this arrangement the breaking of the tap is avoided, and the first few turns of the thread are cut under spring pressure, after which the lead given by the threads already cut insure the proper progress of the tap through the blank.

No reversing mechanism is provided for the tap spindle. As the tap threads blank after blank, the latter pass rearward off of the threaded part of the tap onto the shank thereof, thus avoiding the waste of time which would be incurred if the tap were forced to reverse its rotation and withdraw from the blank at the end of each tapping operation. Means to be subsequently described automatically stops the reciprocation of the head stock when a definite number of nuts have in the ordinary course of operation been tapped and carried back onto the shank of the tap. The tap is then to be taken from the tap spindle by an attendant, who slides the tapped nuts therefrom off of the rear end of the shank. He then replaces the tap in the spindle, these operations causing only a very short delay, and the operation proceeds as before.

Immediately in front of the index station at which the blank is tapped, I place a fixed wrench S, through which the tap passes to reach the nut. According to the timing of the apparatus, the tap will have passed into the blank sufficiently far to cause the blank to be held on the threads of the tap by the time the head stock begins its backward movement away from the turret. By an automatic arrangement of the locking device for the chucks on the turret, to be presently described, the particular chuck holding the nut at the tapping station is slightly released just before the head stock begins its backward movement. The tap, therefore, pulls the partly tapped blank from the chuck and draws it into the fixed wrench S, whereby the nut blank is held against turning, and the continued turning of the tap carries it through the blank until the latter has passed over the threads of the tap onto the shank thereof.

The turret B is fixed to a rotating shaft $b$ mounted in suitable bearings at one end, and the turret itself is supported in suitable bearings on the machine frame, as shown in Fig. 1. The chucks are on the rear vertical face of the turret, and said chucks are arranged as stated, at uniform distances apart and all at the same distance from the axis of the turret. Each chuck consists of jaws E, E', of which the jaw E' is movable. The turret is turned automatically and periodically arcual distances corresponding with the distance between two adjacent chucks. The mechanism for so turning the turret consists of a star wheel D fixed to the turret and having notches for the reception of a friction roller $g'$ on the end of an arm $g$ fixed to the cam shaft G. On this cam shaft is a cam $g^2$ for operating an index pin Q through a connecting rod $q$ and a rock shaft $q'$ mounted on the frame of the machine and having two arms $q^2$ $q^3$ of which the latter engages with the index pin Q (see Figs. 2, 4 and 6). The cam acts to so rock this shaft as to drive the index pin Q into one of the indexing recesses in the periphery of the turret; and a spring $q^4$ acts to hold this pin in its detent and is withdrawn when the cam is in proper position to operate the same, and as soon as the cam has ceased its operation the spring immediately throws the pin into a detent which follows the detent it had previously occupied.

Each of the movable jaws E' of the several chucks slides radially in a guideway on the end of the turret and toward the axis of the turret to open the chuck. Three jaws, to form a chuck, of which the two jaws E are adjustably fixed, are so disposed that the three jaws may grasp the alternate sides of a hexagonal nut blank. Of course, if the blank were of a different shape, these jaws would be otherwise disposed with respect to each other.

For the purpose of holding each of the movable jaws E' securely against the nut blank and holding it solidly in the grip of the three jaws, cams R are provided. These cams are fixed to the rear ends of rock shafts $r$ mounted in the turret, each having fixed to its rear end a gear segment $r'$. The cams R are of such shape that the amount of movement which they impart to the jaw E' is dependent upon the degree to which they are turned. Inasmuch as in nuts substantially of a given size, the individual nuts frequently slightly vary in dimensions, I have provided means for controlling the rotation of this cam which will automatically cause the required movement of the movable chuck jaw irrespective of the small variations in dimensions of the nut blanks being operated upon.

Associated with each gear segment $r'$ is a bell crank lever T pivoted to the star wheel D which, as stated, is rigidly fixed to the turret. One arm of each bell crank has a gear segment $t$ meshing with the gear segment $r'$. The other arm of said bell crank carries a lever $t'$ which is held by a spring $t^2$ in contact with a stop $t^3$, and therefore in the required position. A friction roller $t^4$ on this lever $t'$ engages with the periphery of a cam U which is mounted on the shaft $b$. This cam is of such shape adapted to be engaged by a pin $z^2$ carried by the ratchet wheel Z. When this latter wheel has made one complete revolution, this pin, striking the latch, lifts it and thereupon a spring $w^2$ moves this bar and the clutch operating rod V in the direction to disconnect the cam shaft G from its driving mechanism. The spring $w^2$ engages at one end with a clutch operating lever $v'$ which, in turn, is connected with both bar W and clutch rod V. This clutch-rod V goes longitudinally through the shaft on which the driving pulley J is secured, and by its endwise movement moves said shaft endwise so as to disconnect the clutch jaw $j$. This stops the operation of the cam shaft, and consequently of the turret and head stock, so that the operator may remove the tap from its spindle and take the finished nuts from the shank thereof. Having replaced the tap in its spindle the operator, by moving the lever $V'$, causes the reëngagement of the clutch jaws $j$ and the consequent starting of the cam shaft and the restoration of the bar W and latch $w$ to the position shown in Fig. 1.

When the reciprocation of the head stock has been stopped, in the manner described, the rotation of the tap spindle is also stopped in order that the attendant may remove the tap and take the nuts therefrom. In order that this may be done an annular groove $p^4$ is formed on this spindle, preferably in the collar $p'$. A lever 2 is pivoted to the side of the machine frame, and has a pin 3 extending into this groove. By swinging this lever to the right, (as shown in Fig. 1) the tap spindle may be moved endwise in its bearings, and in opposition to spring $p^2$,—and far enough to move the gear $p^5$ on said spindle out of meshing relation to the gear $h^2$ on the shaft H. A latch 4 may engage with a pin 5 on lever 2, and hold it back until the top has been removed and replaced.

Having described my invention, I claim:

1. In a machine of the character described, the combination of a rotatable turret carrying a plurality of nut holding chucks arranged in an annular row about the axis of the turret, mechanism for turning said turret intermittently predetermined distances, a movable head stock, mechanism carried by said head stock for drilling, tapping and facing nuts held in said chucks, said mechanism being located opposite the different chucks when the turret is stationary, means for intermittently reciprocating the head stock, means for feeding nuts to the chucks, means for opening and closing the chucks, each of said chucks being opened by said means at a time when it is in engagement with the tapping spindle, whereby the nut leaves the chuck and passes upon said tapping spindle.

2. In a machine of the character specified, the combination with a rotatable turret having a plurality of nut holding chucks mounted thereon, means for moving said turret intermittently distances corresponding with the distances between the chucks, a head stock movable between and from said turret, a plurality of spindles rotatably mounted thereon, the axis of the spindles being in line with the chucks when the turret is stationary, means for feeding nuts to the holding chucks, means for opening and closing the chucks, each of said chucks being opened by said means at a certain time while the nut held therein is in engagement with a certain spindle, whereby the nut leaves the chuck and passes upon the spindle.

3. In a machine of the character described, the combination with a nut holding chuck, a rotatable tool, means for reciprocating said tool as it rotates, a fixed wrench located intermediate of the tool and chuck, and means for opening the chuck while the tool engages the nut to permit the withdrawal of the nut upon the tool and into engagement with said wrench.

4. In a machine of the character described, the combination of a nut holding chuck, a rotatable tool, means for reciprocating said tool as it rotates, a spring yieldingly holding said tool in working position, a fixed wrench through which said tool passes when reciprocated, and means for opening said clutch to permit the withdrawal of the nut upon the tool and into engagement with the wrench.

5. In a machine of the character specified, the combination of a rotatable turret, a plurality of nut holding chucks carried thereby, means for moving said turret intermittently arcual distances corresponding with the distances between the chucks, a nut feeding chute, a head stock movable toward and from said turret, a plurality of spindles rotatably mounted thereon with their axes in line with the several chucks when the turret is stationary, and a spring actuated plunger carried by said head stock and adapted to force a nut out of said chute and into an adjacent chuck, and means for opening and closing said chucks.

6. The combination of a rotatable turret, a plurality of chucks, each of which includes a movable jaw, a rock shaft associated with each movable jaw, a cam fixed thereto for operating on the jaw to close it, a gear segment fixed to each rock shaft, a lever having gear teeth which engages said segment, and means for operating said levers and thereby to open and close the chuck jaws.

7. The combination of a rotatable turret, a plurality of chucks, each of which includes a movable jaw, a rock shaft associated with each movable jaw, a cam fixed thereto for operating on the jaw to close it, that when the greater part of its periphery is so acting on the bell cranks T the cams R are held in that position which closes the associated chuck jaws. There is, however, a part of this cam surface, as at $u^2$, which is cut back so that when it is operated on a bell crank the latter, moved by the spring $t^2$, will so swing as to release the associated clutch jaw. There is also another short peripheral part of the cam, as at $u$, which is only slightly cut back and this is at such position that it will engage with lever $t'$ which is associated with the clutch at the fifth or tapping station. That is to say, it will engage with said lever and will allow the movable jaw of this particular clutch to be slightly opened, when the cam U has been turned, as it will be when the nut has been partly tapped. This cam U is turned backward and forward through a short arc by means of a cam $g^5$ fixed to the cam shaft G, and a connecting rod $u^3$ pivoted to the cam and carried to a point where it will engage the cam $g^5$.

In the operation of the machine the cam shaft G is continuously rotated until the tap spindle has on it the required number of nuts. The rotation of the spindles in the head stock is obtained from a separate pulley $h'$ fixed to the shaft H, which has a spur gear connection with the several spindles. This is not an essential of the invention, but it is a desirable one, because it permits the attainment of relative high speed of the various spindles, without using a mass of reduction gearing, and it permits such an arrangement of the apparatus that the rotation of the tap spindle may be stopped and started quickly without shock to the machine and without delay due to the inertia of a large mass of moving machinery.

Assuming the parts to be in the position shown in Fig. 3, the forward movement of the head stock will cause the feeding plunger C to push a blank out of the feed pocket $a$ into the chuck at the receiving station. The lever $t'$ associated with this chuck is at this time engaging with the surface $u^2$ of the cam U, and is therefore open. The feed plunger C will, under spring pressure, press the blank into the chuck and hold it squarely against such stops or shoulders $e'$ as may be provided for limiting the movement of said blank. These stops or shoulders, which may be on the jaws, are provided for the purpose of giving the blank a fixed relationship to the facing tool so that at the end of the facing operation every nut will have the same thickness regardless of the individual variations in the blanks. While the turret is still stationary and the blank thus held, the cam $g^5$ controlling the cam U turns said cam in such wise as to carry the large diametered part thereof against the associated lever $t'$ thereby, through the mechanism described, turning cam R so as to close the movable chuck jaw. After the blank is so gripped by the chuck the cam $g^3$ controlling the head stock retracts it; and the turret is turned by the mechanism already described an arcual distance corresponding with the distance between two adjacent chucks, and the turret is locked in this position by the locking pin Q. This brings a new chuck opposite the feed plunger C, which, during the next forward movement of the head stock, pushes the nut blank into the same, and the movable chuck jaw is closed by the means described. The chuck into which a blank was first placed has, however, been carried into position opposite the first drill $m$, which drill performs its function during this forward movement of the head stock. These movements of the turret and head stock and other parts are repeated until all of the chucks are filled, after which the four tools carried by the head stock will each operate upon a nut in the embrace of a chuck during each forward movement of the head stock, and a blank will be inserted into the fifth clutch during this same forward movement. As before stated, when the yielding tap spindle has turned enough to have made a good start in threading the nut presented to the tap, the head stock is withdrawn, and the partly threaded nut blank pulled out of the chuck and carried into the fixed wrench S. In order that this withdrawal of the nut blank from the chuck may be permitted, the cam U will be turned by cam $g^5$ so as to carry the cam surface $u$ into engagement with the lever $t'$ associated with the chuck at the tapping station. Each time the turret moves the movable jaw of the chuck, from which the finished nut has been withdrawn, it is positively opened to its widest opening, because, first, the associated lever $t$ will pass onto the cam surface $u^2$, and the associated spring $t^2$ will act to rock the bell crank lever T, and, through the described mechanism, to open said jaw. This movement is insured, however, by means of a cam plate Y yieldingly held in operative position by a spring $y$ so that its cam face will engage a boss $t^5$ on the associated lever $t$, and thereby positively rock the bell crank T in the chuck opening direction.

For the purpose of automatically stopping the movement of the turret and head stock when the stem of the tap is full of finished nuts, I provide a ratchet wheel Z mounted on the side of the machine frame and actuated by a pawl $z'$ carried by the head stock. The number of teeth in this ratchet wheel corresponds with the number of nuts which the tap shank is intended to accommodate. A trigger $w$ is pivoted to a sliding bar W and normally rests in a position where it engages with a bracket $w'$ on the machine frame, in which position it is a gear segment fixed to each rock shaft, a lever having gear teeth which engages said segment, and a cam concentric with the turret for operating said levers and to thereby successively close each chuck jaw and hold it closed and allow it to open all during one revolution of the turret.

8. The combination of a rotatable turret, a plurality of chucks, each of which includes a movable jaw, a rock shaft associated with each movable jaw, a cam fixed thereto for operating on the jaw to close it, a gear segment fixed to each rock shaft, a lever having gear teeth which engages said segment, and a cam concentric with the turret for engaging said levers and to thereby successively close each chuck jaw and hold it closed and allow it to open all during one revolution of the turret, means for turning said cam backward and forward through a short arc, and means for concurrently turning said turret continuously forward distances equal to the arcual distances between the successive chucks.

9. In a machine of the character specified, the combination of a main controlling cam shaft, a rotatable turret mounted on an axis parallel with said shaft, a reciprocating head stock movable in a path parallel with said shaft, a plurality of chucks carried by said turret, mechanism for opening and closing said chucks, and mechanism operated by the main cam shaft for turning the turret intermittently, for operating the chuck closing and opening mechanism, and for reciprocating said head stock, and a plurality of spindles carried by said head stock in alinement with the different stations which the several chucks will occupy when the turret is stationary, means independent of said cam shaft for turning said spindles and means for feeding nuts to the holding chucks, each chuck being open when in engagement with a certain spindle, whereby the nut leaves the chuck and passes upon the spindle.

10. The combination of an intermittently rotatable turret, a series of chucks on the face thereof and arranged symmetrically around its axis, each of said chucks having a movable jaw, a feed spout having a nut feeding pocket at its lower end which is held fixed in alinement with one of the stations to which the several chucks will come as the turret is turned, a reciprocating head stock, a yielding spring plunger carried thereby and adapted to force nuts from said pocket into the adjacent chuck, and shoulders associated with each chuck for limiting the plunger induced movement of the nuts.

11. In a machine of the character specified, the combination of an intermittent rotating turret, a plurality of chucks carried thereby and symmetrically arranged about its axis, each of said chucks having a movable jaw, a cam associated with each chuck for closing the movable jaw, a gear segment fixed to each cam, a plurality of levers pivoted to the turret each having a gear segment engaging with a gear segment associated with a jaw closing cam, a spring controlled lever carried by each of the levers specified, a stop limiting the spring induced movement of said lever, a cam concentric with the turret with which the several yielding levers engage, and means for periodically reciprocating the last mentioned cam through a short arcual path.

12. In a machine of the character specified, the combination of an intermittently rotatable turret, a plurality of chucks carried thereby and arranged symmetrically around the axis, a plurality of levers mounted on the turret, mechanism operated severally by said levers for moving the movable chuck jaws, and a spring controlled cam plate adapted to be engaged by said levers whereby they will be positively turned in the direction to open the chuck jaws.

13. In a machine of the character described, the combination of a rotatable turret, a plurality of chucks thereon, each of which includes a movable jaw, rock shafts mounted in the turret, one of which is associated with each movable jaw, a cam carried by each rock shaft for operating its associated jaw, a cam which is concentric with the turret and movable independently, mechanism for operating said rock shafts and adapted to be operated by the said cam, spring pressed means acting upon said mechanism tending to rock the shaft to open the jaw except when acted upon by the cam.

14. In a machine of the character specified, the combination of a rotatable turret, a plurality of chucks thereon, each of which includes a movable jaw, rock shafts mounted in the turret and associated one with each movable jaw, a cam fixed to each rock shaft for operating the associated jaw to close it, a cam concentric with said turret and movable independently, means for oscillating the latter cam to open and close the jaw at suitable times, and mechanism intermediate of said cam and rock shafts for operating the latter.

15. In a machine of the character specified, the combination of a reciprocating head stock, a rotatable tap spindle mounted thereon, independent mechanisms for reciprocating said head stock and for rotating said tap spindle, and means for connecting and disconnecting said head stock and tap spindles from their respective operating mechanism.

16. In a machine of the character specified, the combination of a reciprocating head stock, and mechanism for operating it, a driving shaft mounted on said head stock, a tap spindle also mounted on said head stock and movable lengthwise in its bearings, intermeshing gears secured to said shaft and spindle respectively, and means for moving the spindle lengthwise in its bearings to carry the gear thereon out of meshing relation with the gear on the driving shaft.

In testimony whereof, I hereunto affix my signature in the presence of two witnesses.

ROY H. SMITH.

Witnesses:
 H. R. SULLIVAN,
 E. B. GILCHRIST.